US007476410B2

(12) United States Patent
Singh et al.

(10) Patent No.: US 7,476,410 B2
(45) Date of Patent: *Jan. 13, 2009

(54) STABLE MEAT PRODUCT FOR A FOOD PRODUCT ENVIRONMENT AND A METHOD FOR MAKING SUCH A PRODUCT

(75) Inventors: Prem S. Singh, Glen Ellyn, IL (US); Deijing Fu, Lisle, IL (US); James Costelloe, Naperville, IL (US); Thomas Henry, McHenry, IL (US)

(73) Assignee: ConAgra Foods RDM, Inc., Omaha, NE (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/642,164

(22) Filed: Dec. 20, 2006

(65) Prior Publication Data
US 2007/0207257 A1    Sep. 6, 2007

Related U.S. Application Data

(60) Provisional application No. 60/872,013, filed on Nov. 30, 2006, provisional application No. 60/861,782, filed on Nov. 30, 2006, provisional application No. 60/744,568, filed on Apr. 10, 2006, provisional application No. 60/778,952, filed on Mar. 3, 2006.

(51) Int. Cl.
*A23L 1/314* (2006.01)
*A23L 1/317* (2006.01)

(52) U.S. Cl. .................................................. 426/646

(58) Field of Classification Search ............... 426/641, 426/646
See application file for complete search history.

(56) References Cited

U.S. PATENT DOCUMENTS

| | | | |
|---|---|---|---|
| 2,899,311 A | 8/1959 | Zick | |
| 3,421,903 A | 1/1969 | Williams | 99/107 |
| 3,482,998 A | 12/1969 | Carroll et al. | |
| 3,523,802 A | 8/1970 | Wandel et al. | 99/229 |
| 3,982,003 A | 9/1976 | Mitchell et al. | |
| 4,409,249 A | 10/1983 | Forkner | 426/100 |
| 5,139,800 A | 8/1992 | Anderson et al. | 426/243 |
| 5,258,194 A | 11/1993 | Anderson et al. | 426/540 |
| 5,290,583 A | 3/1994 | Reznik et al. | 426/614 |

(Continued)

FOREIGN PATENT DOCUMENTS

| | | |
|---|---|---|
| WO | WO 98/05216 | 2/1998 |
| WO | WO 2004/080188 | 9/2004 |

OTHER PUBLICATIONS

International Search Report and Written Opinion mailed Jul. 7, 2008.

(Continued)

*Primary Examiner*—Arthur L Corbin
(74) *Attorney, Agent, or Firm*—Merchant & Gould, P.C.

(57) ABSTRACT

The present invention is directed to a stable meat product and method of making such a product by mixing a raw communicated meat with a salt mix and a carotenoid stabilizing composition to form a complex that after thermal processing allows the meat product to retain its interior and exterior color, flavor, and/or texture during storage in a food composition.

24 Claims, 7 Drawing Sheets

U.S. PATENT DOCUMENTS

| | | | |
|---|---|---|---|
| 5,455,054 A | 10/1995 | Bryson et al. | 426/106 |
| 5,533,441 A | 7/1996 | Reznik et al. | 99/455 |
| 5,576,039 A | 11/1996 | Lewis | 426/250 |
| 5,614,244 A | 3/1997 | Heick et al. | 426/582 |
| 5,670,198 A | 9/1997 | Reznik et al. | 426/614 |
| 5,674,546 A | 10/1997 | Barnes et al. | 426/120 |
| 5,807,597 A | 9/1998 | Barnes et al. | 426/234 |
| 5,932,276 A | 8/1999 | Bhatia et al. | 426/614 |
| 6,090,425 A | 7/2000 | Samimi | 426/399 |
| 6,171,602 B1 | 1/2001 | Roman | 424/401 |
| 6,270,830 B1 | 8/2001 | Kamada et al. | 426/646 |
| 6,391,371 B1 | 5/2002 | Bhatia et al. | 426/614 |
| 6,500,477 B2 | 12/2002 | Wofford | 426/576 |
| 6,808,728 B2 | 10/2004 | Hashisaka et al. | 426/249 |
| 6,878,394 B2 | 4/2005 | Bodor et al. | 426/656 |
| 6,992,172 B1 | 1/2006 | Chang et al. | 530/354 |
| 7,001,635 B2 | 2/2006 | Merritt, II et al. | 426/412 |
| 2003/0224098 A1 | 12/2003 | Mathews | 426/614 |
| 2004/0175476 A1 | 9/2004 | Kross | 426/532 |
| 2005/0196513 A1 | 9/2005 | Lewis et al. | 426/614 |
| 2006/0035006 A1 | 2/2006 | McMindes et al. | |

OTHER PUBLICATIONS

"Astaxanthin, Nature's Super Carotenoid," by R. Todd Lorenz © 2000; BioAstin™ Technical Bulletin #062; Cyanotech Corporation; www.cyanotech.com; revised Oct. 2, 2000; 19 pages.

"Hot Topic: Carotenoids in Food," ENC Egg Nutrition Center, 1050 17th Street NW #560, Washington, D.C. 20036; www.enc-online.org; Fact Sheet; © 2004 all copy and images, per website; 2 pages.

"Biological Function and Cancer Prevention by Paprika Carotenoids," by Takashi Maoka, et al.; Foods Food Ingredients J. Jpn., vol. 209, No. 3, 2004; 1 page.

"Code of Federal Regulations," 9CFR 319, Animals and Animal Products, Chapter III—Food Safety and Inspection Service, Department of Agriculture,; www.cfsan.fda.gov/~lrd/9CF319.html; Nov. 9, 2006; 3 pages.

"Astaxanthin," by R. Todd Lorenz; © 2000; BioAstin™ Technical Bulletin #062; Cyanotech Corporation; www.cyanotech.com; revised Oct. 2, 2000; 3 pages.

"Paprika Carotenoids: Analysis, Isolation, Structure Elucidation," by Jozsef Deli, et al.; Organic Chemistry, vol. 6, No. 13, 2002; 1 page.

"Vitamins, Carotenoids, and Phytochemicals,"© 2001 Nidus Information Services, Inc., 41 East 11th Floor, New York, NY 10003; http://www.well-connected.com/; file://D:\Ham\ham color\Vitamins, Carotenoids, and Phytochemicals.htm; Dec. 13, 2006; 31 pages.

| Ingredients | Test 1 | | | Test 2 | | | Test 3 | | |
|---|---|---|---|---|---|---|---|---|---|
| | % by weight | % by weight | Grams | % by weight | % by weight | Grams | % by weight | % by weight | Grams |
| Ham | | 80.720 | 50.000 | | 79.980 | 50.000 | | 80.720 | 50.000 |
| Water | 8.500 | 6.860 | 4.250 | 8.490 | 6.790 | 4.247 | 8.610 | 6.950 | 4.305 |
| Ice | 6.500 | 5.250 | 3.250 | 7.000 | 5.600 | 3.500 | 6.500 | 5.250 | 3.250 |
| Salt | 3.270 | 2.640 | 1.637 | 3.450 | 2.760 | 1.725 | 3.270 | 2.640 | 1.637 |
| Sugar | 4.400 | 3.550 | 2.200 | 4.900 | 3.920 | 2.450 | 4.400 | 3.550 | 2.200 |
| Sodium Tripolyphosphate (S.T.P.P) | 0.500 | 0.400 | 0.250 | 0.500 | 0.400 | 0.250 | 0.500 | 0.400 | 0.250 |
| Sodium Nitrite (12.5% in Salt) | 0.130 | 0.110 | 0.066 | 0.130 | 0.110 | 0.066 | 0.130 | 0.110 | 0.066 |
| Anti-Oxidant | 0.124 | 0.100 | 0.060 | 0.124 | 0.100 | 0.060 | 0.124 | 0.100 | 0.060 |
| Liquid Smoke | 0.300 | 0.240 | 0.150 | 0.300 | 0.240 | 0.150 | 0.300 | 0.240 | 0.150 |
| Carotenoid Stabilizing Composition | 0.160 | 0.125 | 0.078 | 0.140 | 0.110 | 0.070 | | | |
| Oil Soluble color | | | | 0.020 | 0.020 | 4.012 | | | |
| Red Lake | | | | | | | | 0.040 | |
| Total | 23.880% | 100.000% | 61.941g | 25.060% | 100.000% | 65.250g | 23.840% | 100.000% | 61.920g |

STABLE MEAT PRODUCT FOR A FOOD PRODUCT ENVIRONMENT AND A METHOD FOR MAKING SUCH A PRODUCT

CROSS-REFERENCE TO RELATED APPLICATIONS

The present application claims the benefit under 35 U.S.C. § 119(e) of U.S. Provisional Application Ser. No. 60/778,952, filed Mar. 03, 2006, U.S. Provisional Application Ser. No. 60/744,568, filed Apr. 10, 2006, U.S. Provisional Application Ser. No. 60/861,782, filed Nov. 30, 2006, and U.S. Provisional Application Ser. No. 60/872,013, filed Nov. 30, 2006. Said U.S. Provisional Application Ser. No. 60/778,952, U.S. Provisional Application Ser. No. 60/744,568, Provisional Application Ser. No. 60/861,782, and U.S. Provisional Application Ser. No. 60/872,013 are herein incorporated by reference in their entirety.

FIELD OF THE INVENTION

The present invention relates to a meat product, such as ham, for utilization in a food product, such as a liquid egg product. More particularly, the present invention relates to the utilization of a carotenoid stabilizing composition that when mixed or complexed with a raw meat composition forms a stable complex after further thermal processing that maintains characteristics of a freshly cured cooked meat product in a food product.

BACKGROUND OF THE INVENTION

Meat products are prepared for consumption in a variety of ways. For example, the muscle of an animal may be seasoned, jerked, kippered, mixed with other ingredients, as well as cased, such as in sausages. These meat products may be pre-cooked or par-cooked for storage and latter consumption. Meat products are most often consumed on their own, or as part of dish, such as a stew, a soup, or as a supplement to pasta or other food dishes, including omelets, and the like.

When a meat product, and especially a cured meat such as ham, is stored in a food environment, such as a soup or a liquid egg product, for a period of time (e.g., on the shelf of a supermarket) the meat product Loses its freshly cooked or cured meat characteristics. A food product may be generally defined as a solid, liquid, and/or semi-moist environment that alters or degrades the interior and exterior color, flavor, and/or texture of a meat product during storage in the solid, liquid, and/or semi-moist environment and during and after heating and/or cooking after storage in a solid, liquid, and/or semi-moist environment, such as an oxidative food product. For example, a food composition may be predicted as oxidative by measuring the electrochemical potential of the food composition.

Consumers are informed of freshness and desirability by a food's interior and exterior color, flavor, texture, and odor. For instance, a ham product is typically given a cured color by the interaction of nitrites and myoglobin, but a food product, such as a liquid egg product, will interact with the characteristic cured red color of the ham product and cause the ham product to turn an undesirable color, such as gray, black, or green. Moreover, this interaction affects the flavor and texture of the meat product. Unexpected colors are negatively perceived by consumers (see for example, Suess, D., *Green Eggs, and Ham*).

Food processors spend great effort in working a lengthy temporal period of stability into their products. This effort is expended for both economic and safety reasons. It is apparent that retaining palatability is desirable to consumers, vendors, and processors alike, as it allows finished products to retain their value for a greater period of time. Further, pre-expectation spoilage may make the product undesirable during subsequent purchasing opportunities. Therefore, it would be desirable to provide a meat product that does not appreciably change interior and exterior color, flavor, and/or texture as an ingredient in a food product.

SUMMARY OF THE INVENTION

Accordingly, the present invention is directed to a method for producing a stable meat product, such as ham, that does not have an undesirable interior and exterior color, flavor, and/or texture after being stored in a food product, such as a liquid egg product. A raw comminuted meat product is mixed with a salt mix until the viscosity of the meat changes substantially to feet tacky. A carotenoid stabilizing composition is mixed with the tacky raw meat and interacts with at least one of the protein, myoglobin, and fat of the raw meat composition to form a complex that becomes stable after further thermal processing upon protein denaturation allowing the meat product to remain desirable to consumers after prolonged storage.

In one aspect of the present invention, a food composition is provided. The food composition includes a meat product having stable external color for at least the shelf-life of the food product.

In another aspect of the invention, a food composition is provided. The food composition includes a meat product having stable interior color for at least the shelf-life of the food product.

In a further aspect of the invention, a food composition is provided. The food composition includes a meat product having stable flavor and texture for at least the shelf-life of the food product.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 7, a method for producing a stable meat product is shown in accordance with exemplary embodiments of the present invention. A stable meat product is formed by mixing a carotenoid stabilizing composition with raw meat during its normal processing. For example, typically ham is processed by injecting a brine mix including water, salt mix, cure agent, and spices into raw ham, mixing or tumbling the injected brine mix and the raw ham to form a brine and raw ham mixture, holding the brine and the raw ham mixture for at least 7.5 hours, stuffing the brine and raw ham mixture into a casing, cooking the raw ham and brine mixture to an internal temperature of about 160° F. to about 165° F. to form a cooked ham product that is chilled below 40° F. before packaging or further processing of the cooked ham for incorporation into finished products.

The brine mix utilized in the present invention also includes nitrite, which adds to the preservation and flavor of meat compositions, such as ham, bacon, pepperoni, and the like. Nitrates or nitrites (sodium or potassium nitrites and/or nitrates) are utilized to develop the cured cooked meat product. Additionally, the nitrites have positive effects on flavors in foods such as ham and hot dogs. Nitrites provide antioxidant properties to meat. Furthermore, the nitrites prevent the growth of the food poisoning bacteria clostridium botulinum. Nitrites are mixed with raw meat. The nitrite reacts with the meat pigment myoglobin forming nitrosylmyoglobin (MbNo). Upon further heat treatment MbNo is converted into nitrosylmyochrome. However, the nitrosylmyochrome, along with its antioxidant properties and microbial protection, disappears during storage in food products, such as liquid eggs. Therefore, meat products without an additional stabilizing ingredient or treatment, such as a carotenoid composition, stored in food products generally loose their internal and external coloring and microbial protection from the nitrite interaction.

USDA regulations require processors to label hams with different names if more than a normal amount of water is retained after processing. The requirements for labeling are based on a minimum protein content of the ham after taking into account the fat content (this is known as protein fat-free or PFF). Various categories based on the USDA's PFF levels for products exist for ham. The following are the names allowed for various minimum PFF percentages by the USDA Labeling regulation: Ham, 20.5; Ham With Natural Juices, 18.5; Ham Water Added, 17.0; Ham and Water Product minus X % of Weight is Added Ingredients, less than 17.0 (on a total weight percentage basis, the maximum percent of added substances in the finished product would be inserted as the X value).

Stabilization, in accordance with a preferred embodiment of the present invention, utilizes a carotenoid composition during the extraction of salt soluble proteins from the meat composition. Typically, ham is processed by mixing and tumbling the brine mix with the raw ham. In the present invention, the whole meat muscle of the ham is ground exposing greater surface area of the ham than non-ground ham for increased salt soluble protein extraction allowing more effective interactions with the carotenoid stabilizing composition.

The salt soluble protein extraction takes place during the mixing of the brine mix with the ground raw ham. The salt mix within the brine mix causes the extraction of the salt soluble proteins from the meat composition. The mixing step is done in order to facilitate contact between the surface of the extracted solublized protein components of the raw meat composition and the carotenoid stabilizing composition. The carotenoid stabilizing composition interacts with at least one of the protein, fat, and myoglobin of the meat composition to form a complex. The complex after further thermal processing upon protein denaturation stabilizes the meat product allowing it to retain its internal and external color, flavor, and/or texture during storage in a food product.

Of particular interest to the present invention are liquid egg products containing ham or the like utilized by consumers as a pourable omelet producing mixture. For example, popular pourable omelet producing mixtures include ham and cheese, Denver, southwestern, and ham and vegetable. However, eggs degrade the interior and exterior color, flavor, and/or texture of meats. In particular, ham, a desirable omelet ingredient, is particularly susceptible to spoilage and/or degradation in a liquid egg environment. Generally, liquid egg preparations have a 90 to 120 day shelf-life. Therefore, in a currently favored embodiment, as it relates to stabilizing ham in a liquid egg environment, it is desirable to stabilize ham in a manner which does not alter the ham to consumers, while preventing spoilage and/or degradation in a liquid egg containing solution for 90 to 120 days.

Thus, in such a currently favored exemplary embodiment, the formation of a stable ham product for storage in a liquid egg product is described below. Raw ham is treated by grinding ham trimmings into ⅛" by ⅛" pieces. Bones and gristle are removed from the ham trimming during grinding. The ground ham is mixed with sodium chloride and sodium nitrite for two minutes or until the salt soluble protein extraction is complete, as indicated by the tackiness of the mixture to form a salt and raw ham mixture. Tackiness is generally known by a person of skill in the art. For example, a tacky meat composition is, typically, a meat composition that is sticky or adhesive. A solution of ingredients including tocopherol acetate, anti-oxidants, liquid smoke, flavor protectors, and carotenoid stabilizing compositions are mixed for one minute or until the ingredients are well mixed to form an ingredient solution. The red carotenoid stabilizing composition used for a ham product is, typically, capsanthin extracted from an oleoresin of paprika. The ingredient solution is mixed with the salt and raw ham mixture during the extraction of the salt soluble proteins as indicated by the tackiness of the salt and raw ham mixture to form a first mixture (Mixture 1). Another solution of ingredients including water, ice, sodium, tripolyphosphate, sugar, and ascorbic acid are mixed until the ingredients have fully dissolved to form a clear solution. The clear solution is mixed with Mixture 1 for six minutes or until homogenous to form a homogenous mixture. The homogenous mixture is held overnight for a minimum of eight hours. The held mixture is stuffed into moisture proof log casings ranging in size from 0" to 4" in diameter. The stuffed meat in the casings is forced into 4"×4" metal mold and cooked with steam in an oven at approximately 140° F. for 60 minutes and at 175° F. until the internal temperature of the meat in the casings equals about 160° F. to about 165° F. The cooked ham is chilled with a cold potable water shower at approximately 60° F. for 30 minutes followed by air chilling at 36° F. The ham is diced after the meat casings are removed. The ham is diced to maximize particle size uniformity to offer the best consumer appeal. The diced ham is then screened to narrow the particle size distribution to around the mean. The diced ham may be added to a liquid egg product or further processed. The diced ham may be quick or flash frozen and gas flushed with $N_2$ or $CO_2$ to less than 1% oxygen in a box with an oxygen barrier liner. The flushed meat product may be shipped frozen or further processed, e.g., added to a cheese meat slurry or a liquid egg product.

Other meat products may be stabilized by adding a carotenoid composition including bacon, Canadian bacon, sausage, turkey, and other processed meats. The carotenoid stabilizing composition may be added during tumbling after the raw meat has been injected with a brine mixture. For example, bacon may be stabilized in accordance with a carotenoid in accordance with the present invention, wherein the carotenoid is selected to provide the desired hue of cooked or uncooked bacon. It will be appreciated that the present invention may be utilized to provide a stable and uniform external and internal color to various meats by adjusting the recited exemplary embodiment. A Hunter calorimeter a-value may be selected to monitor the product color change during the storage and as an indication of the desired freshly cured and cooked color of ham. For example, turkey and a type of processed meat, such as pepperoni, are typically stabilized by mixing with a carotenoid composition to give them an acceptable Hunter calorimeter a-value during storage in the liquid egg product with a 90 to 120 day shelf-life.

In one embodiment, the raw ham or meat composition may be comminuted by dicing, grinding, chopping, slicing, or in some other way to increase the surface area available for salt soluble extraction and contact with the carotenoid stabilizing composition utilized to retain the color of the meat product. As such, any of a variety of methods may be utilized to increase the surface area of the meat composition; however, grinding is an option that is both economical and easily accomplished. For instance, a grinder may be utilized to grind the ham. A grind equaling a $\frac{1}{16}^{th}$ of an inch plate may be utilized. The method may be part of a process with the grinding done in batches or as part of a continuous process.

The salt mix may be added in an amount from about 1.5% to 4% by weight of the raw meat composition. Any variety of specific types of salt suitable for consumption may be utilized including iodized or sea salt. In a specific embodiment, sodium nitrite is typically included with the salt. Again, the salt mix extracts salt soluble proteins from the meat composition, which is observable by the tackiness of the meat composition. The carotenoid stabilizing composition, which is hydrophobic, is mixed and emulsified with the meat composition when tackiness is observable in the meat composition.

In a further embodiment, the carotenoid stabilizing composition may be an oleoresin. Oleoresins are naturally derived from products such as paprika. In another embodiment, an oleoresin of paprika may be utilized in retaining the color of the meat product. It will be appreciated that other oil resins including carotenoid content may be utilized as well.

After a carotenoid stabilizing composition is utilized, the color retention of the meat product in the liquid egg environment exists not only on the exterior of the ham piece, but when the piece is cut or opened, the internal color remains red or pink as well. Thus, the internal or interior color of the meat product does not change to an undesirable color, such as gray, during the shelf-life of the food product.

In a specific embodiment, the oleoresin is added in an amount equal to less than 1% by weight of the finished product. The amount of oleoresin added is dependent upon the desired intensity of color. As such, the amount added is dependent upon the desired finished appearance of the product. More particularly, in a specific embodiment, the oleoresin is added in an amount ranging from 0.07% by weight to 0.25% by weight.

Figure 1:
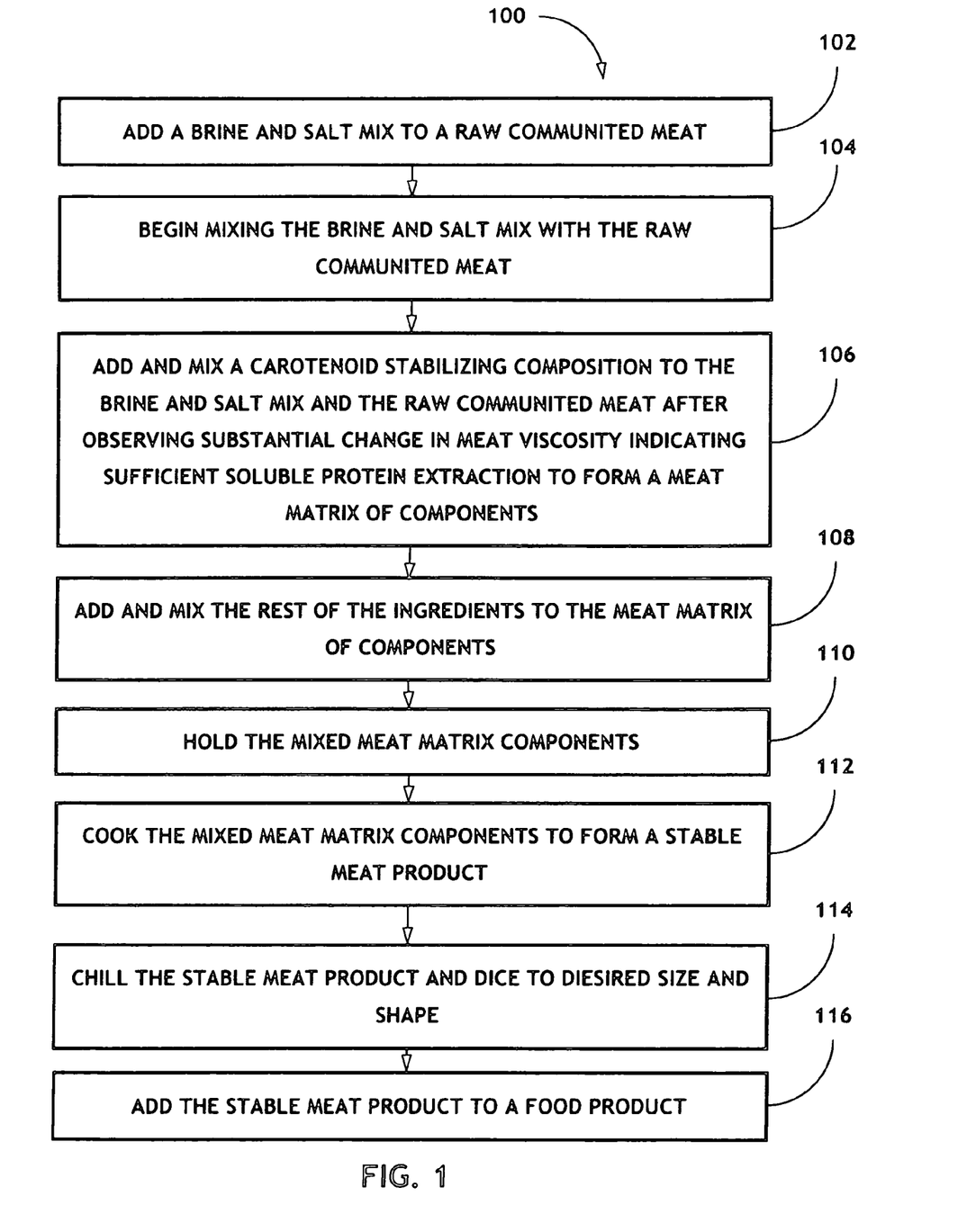
FIG. 1 is a flow diagram illustrating a method for producing a stable meat product in accordance with an exemplary embodiment of the present invention.

Referring now to FIG. 1, a method 100 for producing a stable meat composition for storing in a food product is illustrated in accordance with an exemplary embodiment of the present invention. A brine and salt mix is added to a raw comminuted meat, 102. The brine and salt mix is mixed with the raw comminuted meat, 104, causing salt soluble proteins to be extracted from the raw meat, which is observable by the tackiness and viscosity change of the meat composition. A carotenoid stabilizing composition is added, 106, to the mixture when the meat composition becomes tacky to form a meat matrix of components. The rest of the ingredients, such as sugar and spices, are added to and mixed with the meat matrix of components, 108. The mixed meat matrix components are held for about 3 to about 24 hours to let the meat protein fully interact with the carotenoid stabilizing composition, 110. The held mixed meat matrix components may be stuffed in casings. The held mixed meat matrix components may be cooked to a temperature above protein denaturation (above 140° F.) to form a color, flavor and/or texture stable meat product, 112. The PFF of the meat product may be measured to guarantee the meat product meets the PFF guidelines set by the USDA. The stable meat product is chilled and diced, 114. The stable meat product is added to the food product, such as a liquid egg product, 116.

Figure 2:
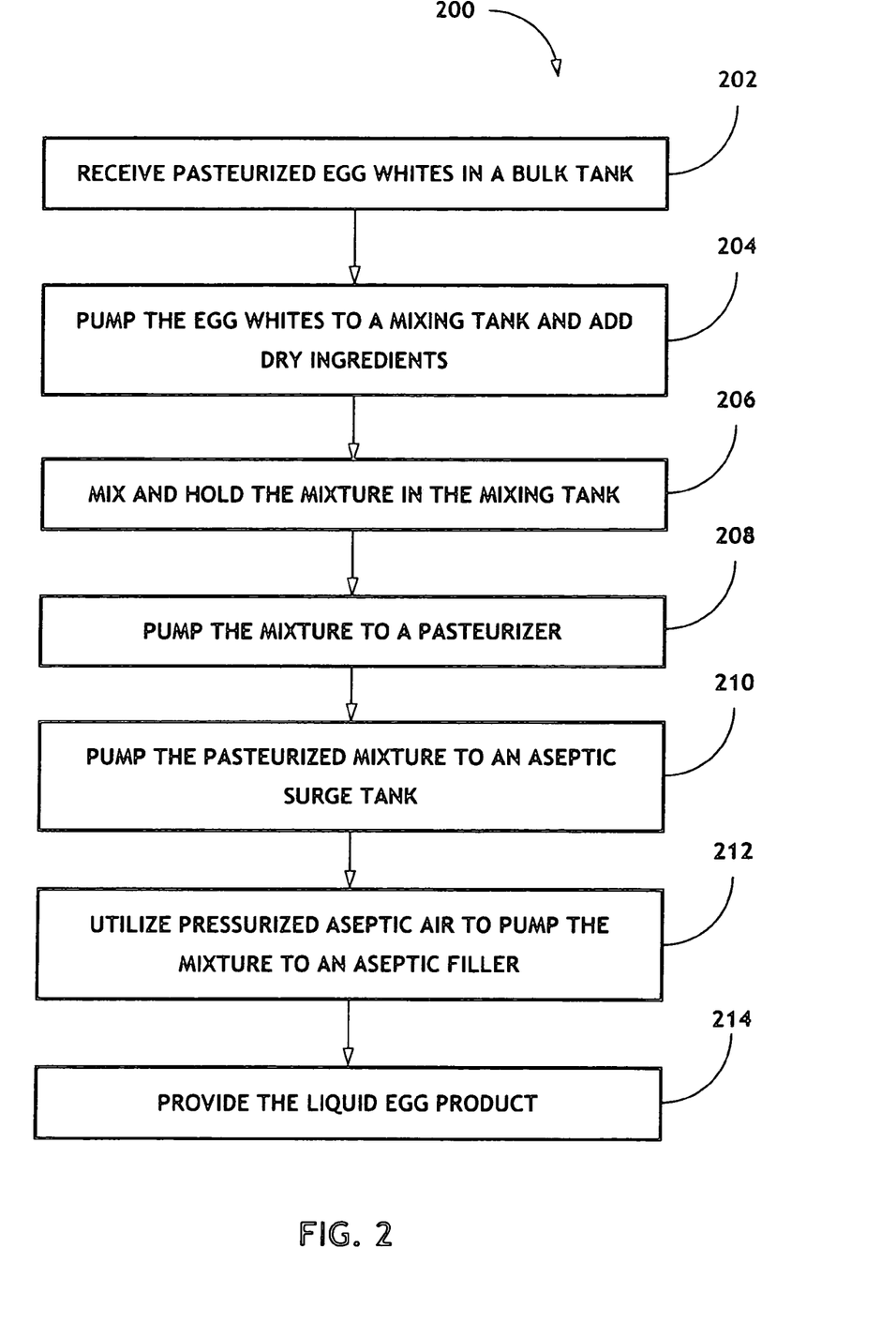
FIG. 2 is a flow diagram illustrating a presently preferred method for forming a liquid egg composition in accordance with an exemplary embodiment of the present invention.

In referring to the exemplary embodiment of FIG. 2, the process for forming a liquid egg product is illustrated, 200. Pasteurized egg whites from a bulk tank, 202, are pumped in to a mixing tank, 204. Dry ingredients, 204, are added to the mixing tank. The egg whites and dry ingredients are mixed until homogenous, 206. The mixture is then pasteurized, 208. For example, the pasteurization method disclosed in U.S. Pat. No. 5,096,728 herein incorporated by reference may be utilized. Additionally, the pasteurizer, 208, may comprise technologies such as heating (single or multi-stage), radiation, chemical, ultrasonic, high pressure pasteurization, some other suitable pasteurizing technique, and/or a combination of pasteurizing techniques. This list is exemplary only. It is contemplated that other suitable technologies may be utilized without departing from the scope and intent of the present invention. The pasteurized mixture is placed in an aseptic surge tank, 210. Pressurized aseptic air is utilized to pump the pasteurized mixture into a small reservoir tank in a controlled amount by weight of the mixture and then the mixture is pumped into an aseptic filler, 212, to produce the liquid egg product, 214.

How the stable meat product is added to the food product will depend on the finished product and the type of characteristic altering food composition being utilized (e.g., liquid egg product and soup). In a particular embodiment, where the food product is a liquid egg product, the stable meat product, such as ham, will typically be added to a heated starch slurry that may also contain cheese. The ham slurry is added to the liquid egg product.

Figure 3:
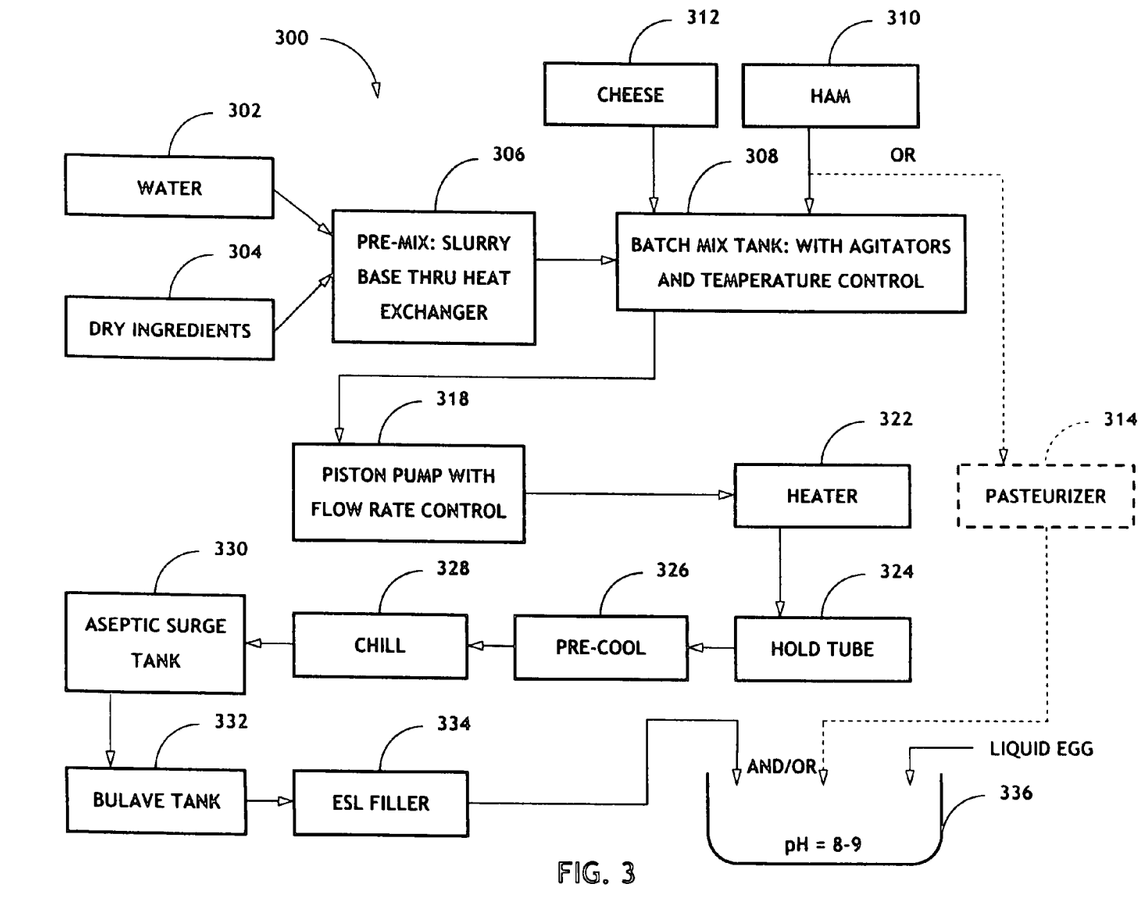
FIG. 3 is a flow diagram illustrating a presently preferred method for forming ham slurry for incorporation in liquid egg in accordance with an exemplary embodiment of the present invention.
Figure 4:
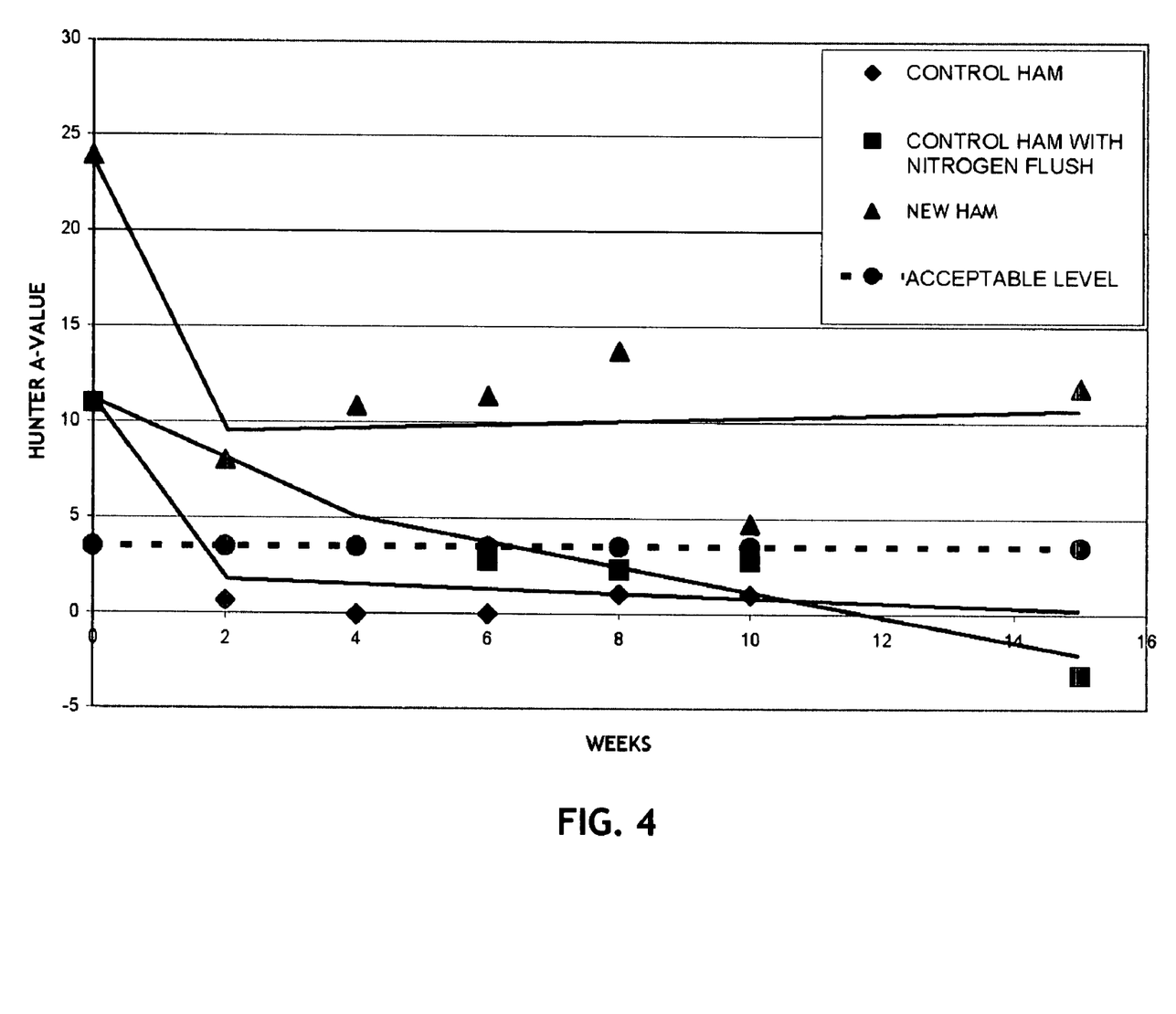
FIG. 4 is a table illustrating the color value (Hunter colorimeter a-value) for various ham products in accordance with an exemplary embodiment of the present invention.

In referring to the exemplary embodiment of FIG. 3, the process for forming a liquid egg and stable ham product is shown, 300. Water, 302, and dry ingredients, 304, are premixed and heated to form a slurry base through a heat exchanger, 306. The slurry base is put into a batch mixing tank, 308, where diced stable ham, 310 (from FIG. 1), and/or cheese, 312, may be added. However, the diced stable ham may be pasteurized independently and added to the slurry.

The mixture with or without ham is sent from the mixing batch tank through a piston pump, 318, and a heater, 322. The slurry mixture is pumped through a hold tube to provide a residence time sufficient to provide a certain lethality kill value of microorganisms, 324. The slurry mixture is pre-cooled, 326, chilled, 328, and placed into an aseptic surge tank, 330. Pressurized aseptic air is utilized to pump the mixture into a filler bowl, 332 in a controlled amount by weight of the mixture. The mixture is pumped from the filler bowl into an ESL filler, 334, by a PD pump. Next, the slurry mixture is added to the liquid egg product, 336. A similar method disclosed by U.S. Pat. No. 5,266,338 incorporated by reference may be utilized. Additionally, if vegetables are desired, a vegetable slurry may be added to the liquid egg product. The vegetables may be added by utilizing the disclosed method of U.S. Pat. No. 4,910,036 herein incorporated by reference.

If the stable ham, 310, is not added to the mixing tank, the stable ham, 310, is sent to a pasteurizer, 314, that utilizes other pasteurizing techniques such as heating (single or multi-stage), radiation, chemical, ultrasonic, high pressure pasteurization, some other suitable pasteurizing technique, and/or a combination of pasteurizing techniques. This list is exemplary only. It is contemplated that other suitable technologies may be utilized without departing from the scope and intent of the present invention. The individually pasteurized diced ham may be directly added to the liquid egg and slurry product, 336.

It will be appreciated that a meat product and/or meat composition includes any ingestible tissue of mammals, birds, reptiles, or fish. A meat product and/or meat composition, therefore, includes, but is not limited to, tissue derived from cattle, porcine, poultry, ruminant (e.g. horse, bison, and deer), and fish sources. A meat product and/or meat composition spoils and/or degrades in a degrading and/or altering environment, such as a liquid egg environment. When a meat product spoils and/or degrades it changes interior and exterior color, flavor, texture, and smell. A meat product is typically cooked and a meat composition is typically raw.

Aspects which inform a consumer of relative freshness of any food product, such as meat products, are color, flavor, texture, and odor. Color, flavor, texture, and odor are generally utilized by consumers to determine whether a meat product is desirable. A stable meat product describes a meat product that substantially retains color, flavor, and/or texture during storage in a food product (i.e., a liquid egg product), for at least the shelf-life of the food product. A color is substantially maintained if the color does not appreciably fade from its consumer desirable tint. Moreover, flavor and texture are substantially maintained if they do not appreciably affect average consumer desire and/or demand for the food product. For example, the shelf-life of a refrigerated food product is the average time period from production to the date the product expires and/or spoils and/or becomes undesirable, which is typically between about 2 and about 18 months. For instance, a food composition includes the stable meat product and the food product, and has a shelf-life equal to the food product.

A food product may be generally defined as a solid, liquid, and/or a semi-moist environment that alters or degrades the color, flavor, and/or texture of a meat product during storage in the solid, liquid, and/or semi-moist environment and during and after heating and/or cooking of the meat product after storage in the solid, liquid, and/or semi-moist environment, such as an oxidative food product. For instance, a food composition may be predicted as oxidative by measuring the electrochemical potential of the food composition. For example, a liquid egg product may include one or more of the following including whole egg, egg white, egg yolk, or egg substitute. The liquid egg product may be refrigerated and/or pasteurized. The liquid egg product may also include products such as cheeses, vegetables, condiments, flavorings, and/or food additives.

Carotenoids naturally occur in animals, plants, and some other photosynthetic organisms like algae, some types of fungus and some bacteria. There are over 600 known carotenoids. Carotenoids are generally divided into two groups: xanthophylls and carotenes. Carotenoids are lipid-soluble, insoluble in water, have a high melting point, and range in color from yellow to deep red. For example, paprika contains the red carotenoids capsanthin, capsorubin, and capsanthin 5,6-epoxide, possessing a 3-hydroxy K-end group. It will be appreciated that the list of red paprika carotenoids is exemplary only and not meant to be restrictive of the present invention. It is contemplated that a variety of carotenoids may be utilized with the present invention, such as beta-carotene, lycopene, lutein, zeaxanthin, and astaxanthin.

Some health experts have reported that dietary carotenoids are an important part of a healthy diet. For example, carotenoids are believed to increase metabolism while decreasing the risk of diseases including certain cancers, stroke, heart disease, and eye disease. Additionally, carotenoids are also presumed to enhance the immune system.

Several other methods may be utilized to retain the color of a meat product during storage in a food product including at least one of liquid smoke, colored gelatin coatings, colored protein coatings, colored starch coatings, browning agents, shellac, and caramel coloring. However, these methods do not provide thorough and uniform meat piece or particle stabilization. For example, these methods do not allow the meat product to retain its internal coloring. Moreover, these methods do not substantially retain the flavor and texture of a meat product during storage in a food product. Therefore, these methods may be used to retain, mask, or dye the exterior color of a meat product, but without the same intensity and for not as long as the carotenoid stabilization compositions.

Finally, RED LAKE may also be utilized to retain the color of a meat product during storage in a food product. A RED LAKE stabilizing composition, such as RED LAKE #40, may maintain the color of a meat product during storage in a food product, such as a liquid egg product, but RED LAKE is an artificial coloring. Therefore, meat products stabilized using RED LAKE or any artificial dye may not be labeled as meat additive (U.S.D.A. regulations).

In a non-preferred embodiment, caramel coloring and dyes, such as RED LAKE, may be added to the meat composition during processing like the carotenoid stabilizing composition. Liquid smoke, colored gelatin coatings, colored protein coatings, colored starch coatings, browning agents, and shellac are all coatings that are generally and often preferably applied to a cooked and fully processed meat product to stabilize the color of the meat products during storage in a food product, such as a liquid egg product. Again, these methods only allow the meat product to retain its external color and not its internal color.

EXAMPLE 1

Figure 6:
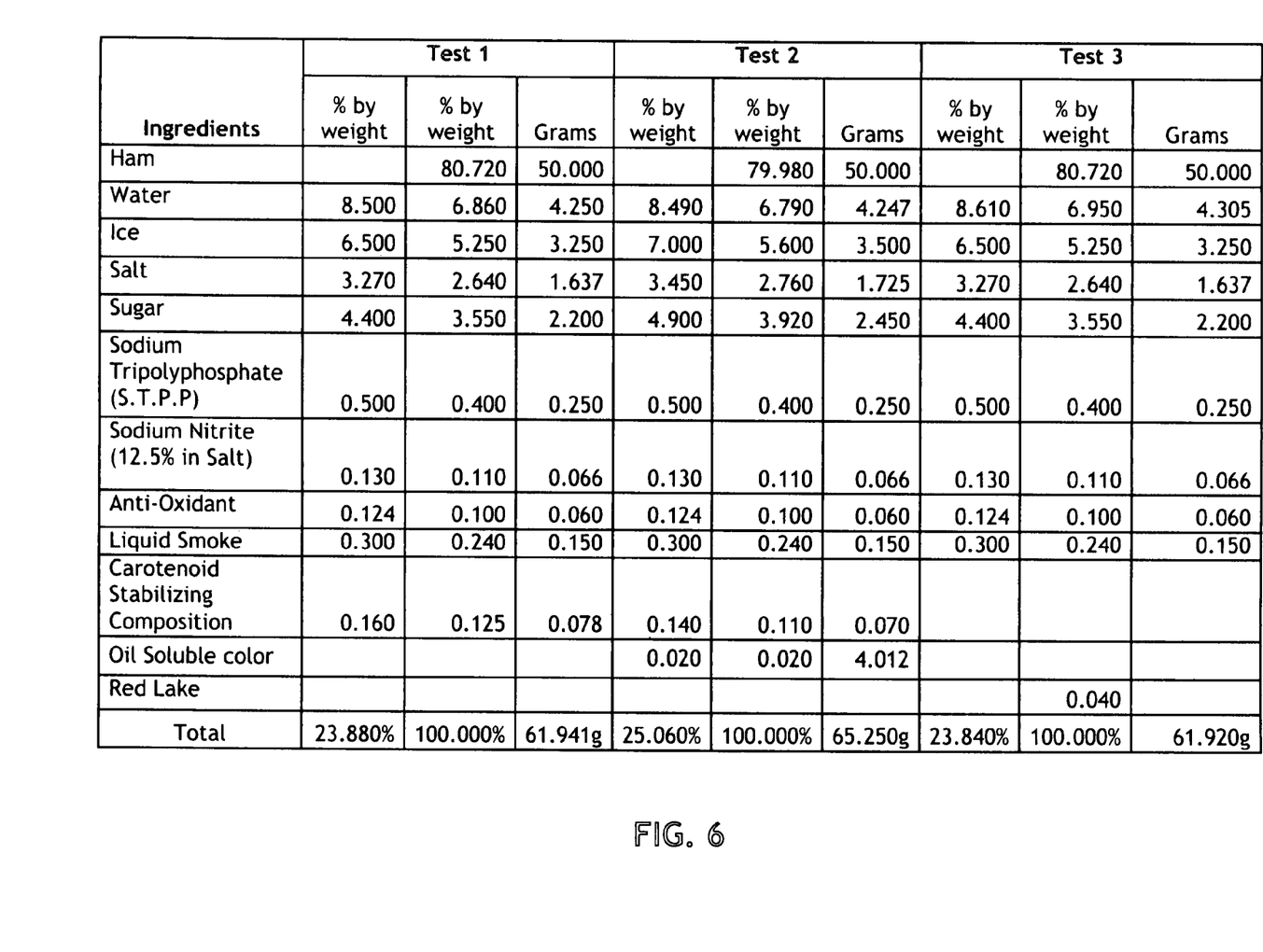
FIG. 6 is a table illustrating the presently preferred preparations of stable ham compositions that were made in accordance with an exemplary embodiment of the present invention.

FIG. 6 displays various preparations of a ham and paprika mixture that were made.

In one embodiment, the following steps were utilized to prepare the ham mixture. Water, ice with sodium tripolyphate, sugar, and ascorbic acid were mixed until fully dissolved. The ham knuckle was ground through a 1/16" plate and salt with nitrite was added. The resulting mixture was mixed for 2 minutes. After the viscosity of the ham and salt mixture substantially changed to feel tacky, vitamin E, liquid smoke, flavor guard, and carotenoid were mixed together for about 1 minute. The water, ice with sodium tripolyphate, and sugar solution was mixed with the ham under a vacuum mix for 6 minutes. The final mixture was held overnight and stuffed into a moisture proof casing.

Next, the ham was cooked to an internal temperature of 165° F. It was then chilled to 38° F. and diced to ¼"×⅛" sized pieces. The diced ham is then screened to narrow the particle size distribution to around the mean. The ham was then subjected to IQF and gas flushed for shipment. As such, a ham, stabilized by forming a ham and carotenoid complex after further thermal processing, was available for utilization. The Hunter calorimeter a-value of the color of the ham product was measured to ensure that the color was consumer desirable and/or acceptable before further processing and addition into a liquid egg product. Moreover, the PFF of the stable ham was measured to guarantee the ham product met the PFF guidelines set by the USDA.

EXAMPLE 2

The following is a preparation of the ham mixture of Example 1 with a liquid egg composition to form a ham and egg mix. This was done to determine optimal formulations. Two formulas were made, one contained 2% ham by weight of the composition and the other 3.5% ham by weight of the composition. The use of lactic acid is exemplary only. It will be understood that other mixtures without lactic acid may be utilized without departing from the scope and intent of the present invention. The ingredients utilized are listed in the table that follows:

Preparation of Ham & Cheese Slurry Liquid Egg
Ham & Cheese Formula Optimization Study

| Ingredients | 2% Ham Percent | 3.5% Ham Percent |
|---|---|---|
| Water | 55.56 | 42.11 |
| Cheese | 15.00 | 14.92 |
| Diced New Ham | 19.00 | 33.25 |
| Sour Cream | 4.96 | 4.96 |
| Starch | 3.09 | 2.38 |
| Salt | 1.29 | 1.29 |
| Spice | 0.79 | 0.79 |
| Lactic Acid 88% | 0.30 | 0.30 |
| Total | 100.00 | 100.00 |

EXAMPLE 3

The ham and egg compositions were then prepared for color testing. First, ham by itself was prepared for testing. Second, a ham and liquid egg composition was prepared for testing.

Ham Slurry Procedure:

In another embodiment of the present invention, the following steps were followed to prepare the ham mixture. Ham was diced into ¼"×¼"×⅛" sized pieces. Water was placed in the upper pot of a double boiler and then starch and salt were dispersed into the water and mixed well. Next, cheeses and the diced ham were added to the water in the upper pot of the double boiler as it was heated. As soon as the temperature reached 198° F. the lid was tightly placed on the upper pot of a double boiler. Meanwhile, water was placed in the lower pot of the double boiler and kept boiling. Next, the upper pot was placed on the lower pot of the double boiler and the batch was allowed to cook with the lid tightly closed for about 10 more minutes. The heat was turned off and the upper pot of the double boiler was transferred to an ice water bath to cool.

Ham and Cheese Liquid Egg Sample Preparation:

A scale is placed under a tissue culture hood (hood). The entire scale is wiped with a paper towel spread with alcohol. Plastic spoons are wiped with an alcohol wipe and stored in a sterilized beaker. The beaker is placed under the hood. Another sterilized beaker is placed next to the scale. An ultraviolet light is turned on for 10 minutes to sterilize the environment.

Under the hood, the caps from the liquid egg product cartons are removed, placed upside down, sprayed with alcohol, and then allowed to dry. Next, the rim of the spout is wiped with an alcohol wipe and the spout's tab is pulled. The cartons are set aside. The ham slurry pot is placed under the hood. The lip of the pot is removed while under the hood. The ham and cheese slurry is mixed in ratio of 11% basis total weight of finished egg composition.

The samples were then packaged in different environments.

Packaging:

For non-vacuumed samples, the cartons were recapped and then labeled with sample numbers. For gas flush samples, the ham and cheese liquid egg mixture was poured into an oxygen barrier bag, which was vacuum packed by pulling the air out of the packages to lower the oxygen level below 1% and then flushed with a gas mixture of 20% $CO_2$ and 80% $N_2$.

EXAMPLE 4

The ham products prepared in Example 3 were analyzed for color retention using Hunter colorimeter a-value as illustrated below.

| | Hunter Colorimeter a-Value | | | | |
|---|---|---|---|---|---|
| Weeks | Control-Ham | Control Ham with Nitrogen flush | New Ham | Red lake | Liquid Smoke |
| 0 | 11.00 | 11.00 | 23.94 | 22.60 | 12.69 |
| 2 | 0.67 | | 7.99 | 14.31 | |
| 4 | −0.04 | | 10.87 | 11.03 | 5.39 |
| 6 | −0.01 | 2.78 | 11.38 | 5.29 | 5.76 |
| 8 | 1.03 | 2.34 | 13.75 | 7.25 | Inside color fade |
| 10 | 1.00 | 2.77 | 4.72 | 8.39 | |
| 15 | | −3.18 | 11.85 | 6.00 | |

The new ham represents a ham product mixed with the carotenoid stabilizing composition to form a stable ham product. The new ham retained internal color and substantially more external color than any of the other methods utilized. For instance, after only 8 weeks the Hunter colorimeter a-value of new ham was 13.75, while the Hunter colorimeter a-value of control ham was 1.03 and the Hunter colorimeter a-value of control ham with nitrogen flush was 2.34 evidencing that the new ham retained substantially more color and color for longer than the control ham and the control ham with nitrogen flush. For example, after 15 weeks the new ham had a Hunter colorimeter a-value of 11.85, while the RED LAKE had a Hunter colorimeter a-value of only 6 and the liquid smoke did not retain any interior color. Therefore, it is apparent that the carotenoid stabilizing composition substantially retains more color and color for longer than RED LAKE and liquid smoke when combined with a meat product. The PFF of the new ham was, also, measured to guarantee the ham product met the PFF guidelines set by the USDA. The PFF of the ham was measured at about 18; therefore, the ham was labeled water added ham by USDA regulations.

EXAMPLE 5

To follow is an example of a ham product that was prepared that had stable red color.

| Batch Name | Amount |
| --- | --- |
| Meat Fraction | |
| Gold Trim 0128 Knuckles | 81.1873 lb |
| Moisture Fraction | |
| Water | 10.9569 lb |
| Non-Meat Fraction | |
| Granulated Cane Sugar | 4.0425 lb |
| Supreme Fine Flake Salt | 2.7209 lb |
| Sodium Tripolyphosphate | 0.4059 lb |
| Smoke Flavor | 0.2840 lb |
| Cure Mix 8.1% | 0.1815 lb |
| Carotenoid | 0.1250 lb |
| Antioxidant | 0.0580 lb |
| Ascorbic Acid | 0.0381 lb |

Batch weight: 100.0001 lb

In a further embodiment of the invention, the following steps were utilized to prepare the ham product. One-third water was mixed with sodium tripolyphosphate and ascorbic acid until fully dissolved. Salt, nitrite, flavor guard, and ham knuckle ground through a 3/32" plate were added to the composition and mixed for two minutes. Then liquid smoke, oleo resin of paprika, and sugar was added to the composition and mixed further for about one minute. The remaining water was added to the composition and vacuum mixed for six minutes. The final composition was held for about 8 hours and stuffed into a moisture proof casing in 4"×4" molds. Next, the final composition was steam cooked to an internal temperature of 158° F. and chilled down to 34° F. The composition was diced to 5 mm×5 mm×3 mm pieces. Finally, the PFF of the ham product was measured to guarantee the ham product met the PFF guidelines set by the USDA.

EXAMPLE 6

Other methods and products were utilized to produce a ham product that would retain its color white being stored in a food product. The compositions are listed below.

| Test # | Preparation |
| --- | --- |
| 1 | Lunch meat ham coated with 10% gelatin solution and dried in oven-control |
| 2 | Lunch meat ham coated with 10% gelatin solution dried in oven and dipped in 40% liquid smoke. |
| 3 | Lunch meat ham coated with 10% gelatin solution dried in oven and dipped in liquid 100% smoke. |

-continued

| Test # | Preparation |
| --- | --- |
| 4 | Caramel Color 203 Ham - control |
| 5 | Caramel Color 203 Ham - liquid smoke |
| 6 | Caramel Color 203 Ham - 1.60% 203 caramel color solution coating |
| 13 | Caramel Color 203 Ham with egg white - control |
| 14 | Caramel Color 203 Ham with egg white - liquid smoke |
| 15 | Caramel Color 203 Ham egg white -1.60% 203 caramel color solution coating |
| 24 | Ham with 35% egg white - control |
| 25 | Ham with 35% egg white - liquid smoke |

*Liquid smoke 40%
**Oven condition for liquid smoke and caramel color
***Time 6.12 minutes
****Temperature: 280° F.

The PFF of the different ham products were measured to guarantee they met the PFF guidelines set by the USDA. Non-carotenoid tested methods do not substantially retain the flavor and texture of the meat product while stored in a food product. Likewise, non-carotenoid methods, except for RED LAKE, do not retain the color of the meat product for as long as and with the same level of intensity as the carotenoid stabilizing composition.

EXAMPLE 7

Figure 5:
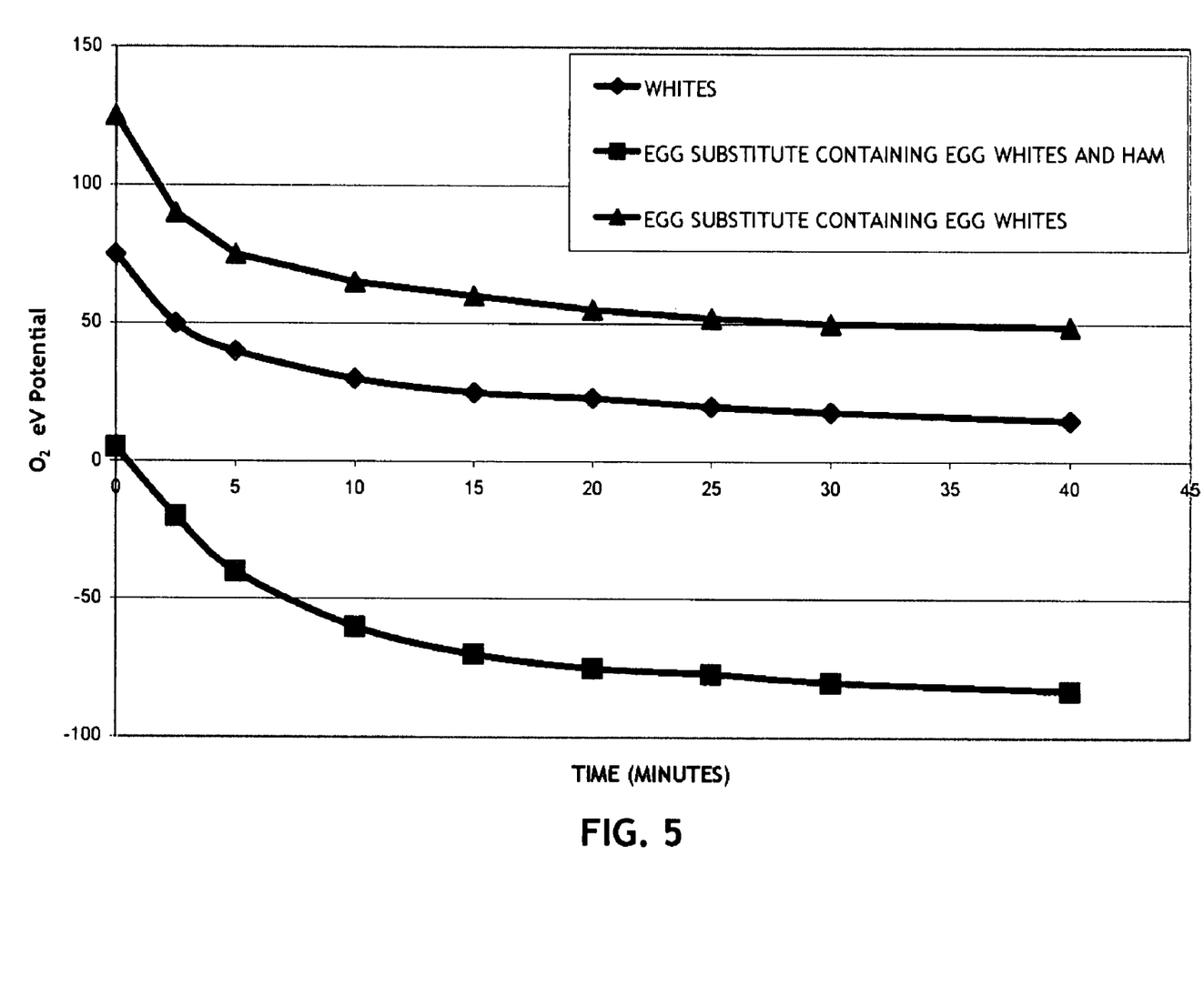
FIG. 5 is a table illustrating the oxidative potential of various products in accordance with an exemplary embodiment of the present invention.

The oxidative potential for fading was also determined. In particular, egg whites, a liquid egg substitute containing egg white, and a liquid egg substitute containing egg white and control ham were tested. The results are illustrated in FIG. 5. The electro-chemical potential was +127 mV for liquid egg substitute containing egg white, +80 mV for egg whites, and +5 mV for liquid egg substitute containing egg white and control ham.

As shown, both liquid egg substitute containing egg white and egg whites had comparatively high oxidative potentials.

EXAMPLE 8

Figure 7:
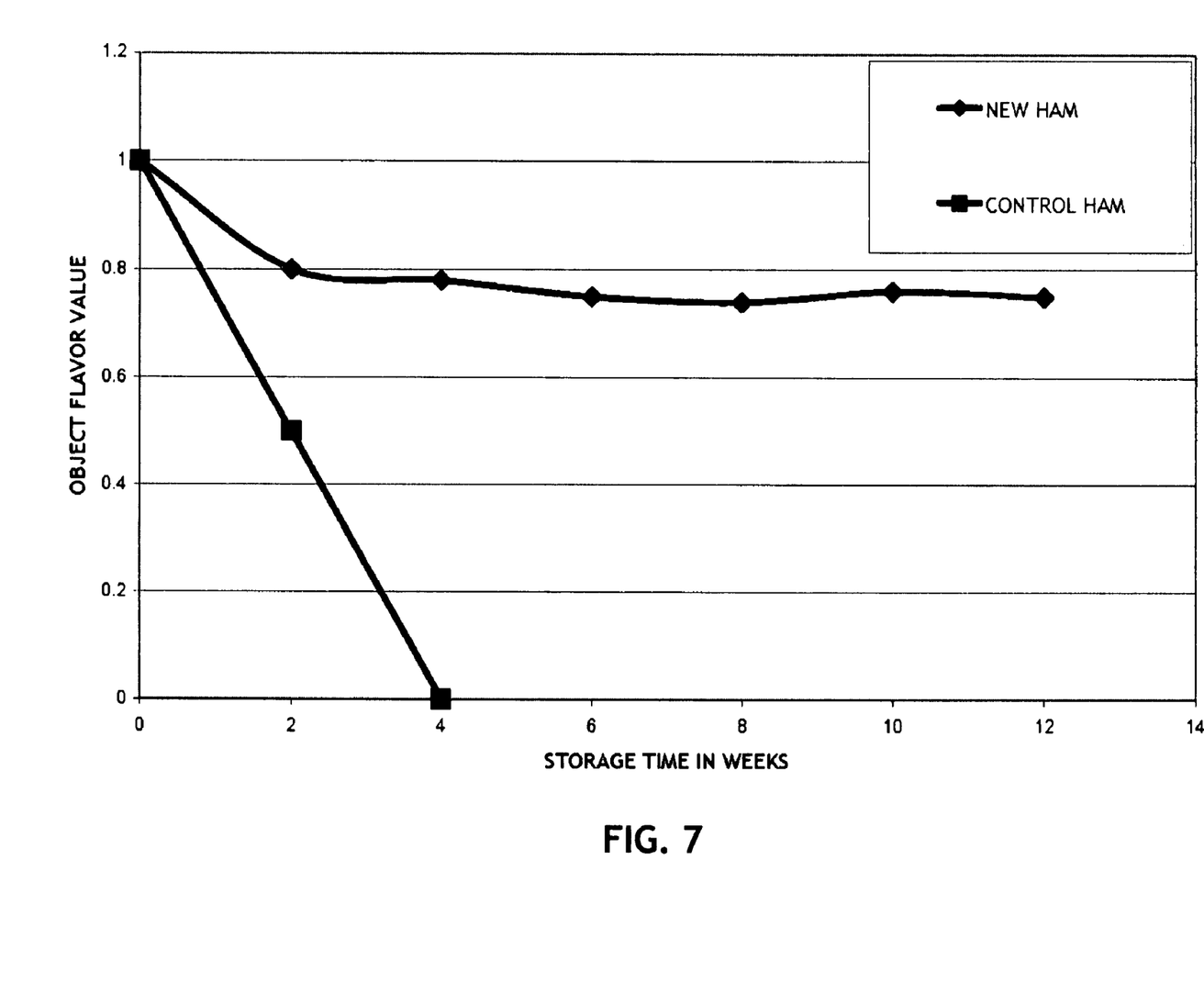
FIG. 7 is a table illustrating the flavor degradation trend of prior art ham products relative to ham products that were made in accordance with an exemplary embodiment of the present invention which have been stored in liquid egg.

The flavor trend of a meat product (control ham) and a stable meat product (new ham) stored in a food product was measured as illustrated in FIG. 7. After only four weeks of storage the control ham's objective flavor value dropped from 1 point to 0 points. The new ham or a ham product mixed with a carotenoid stabilizing composition substantially retained its flavor trend for 12 weeks. The new ham after 12 weeks only dropped to the objective flavor value of 0.75 points. Therefore, the new ham retained flavor significantly better than the control ham.

In exemplary embodiments of the invention, the methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for retaining interior and exterior color, flavor, and texture of a meat product in a food composition, comprising:
   adding a salt mix to a raw comminuted meat composition to form a tacky meat composition;
   mixing a carotenoid stabilizing composition with the tacky meat composition to form a meat precursor;
   processing the meat precursor thermally to form a processed meat precursor; and
   adding the processed meat precursor to a food product,
   wherein the carotenoid stabilizing composition interacts with at least one of fat, protein, and myoglobin of the tacky meat composition to form a complex that after thermal processing and upon protein denaturation, allows at least one of the interior and exterior color, the flavor, and the texture of the meat product to be retained for at least the shelf-life of the food product.

2. The method of claim 1, wherein the raw comminuted meat composition is comminuted by grinding.

3. The method of claim 1 further comprising, adding liquid smoke to the tacky meat composition.

4. The method of claim 1, wherein the raw comminuted meat composition includes at least one of ham, bacon, sausage, turkey, and Canadian bacon.

5. The method of claim 1, wherein the carotenoid stabilizing composition is added in an amount ranging from about 0.05% to about 0.25% by weight of the raw comminuted meat composition.

6. The method of claim 1, wherein the food product includes at least one of a soup and a liquid egg product.

7. The method of claim 1, wherein the carotenoid stabilizing composition includes a fat composition.

8. The method of claim 7, wherein the fat composition includes an oleoresin composition.

9. The method of claim 8, wherein the oleoresin composition is extracted from paprika.

10. A meat product for storing in a food composition comprising:
    a raw comminuted meat composition;
    a salt mix added to the raw comminuted meat composition to form a tacky meat composition;
    a carotenoid stabilizing composition mixed with the tacky meat composition and thermally processed to form a meat precursor; and
    a food product for receiving the meat precursor,
    wherein the carotenoid stabilizing composition interacts with at least one of fat, protein, and myoglobin of the tacky meat composition to form a complex that after thermal processing and upon protein denaturation, allows at least one of the interior and exterior color, the flavor, and the texture of the meat product to be retained for at least the shelf-life of the food product.

11. The meat product of claim 10, wherein the food product includes at least one of a soup and a liquid egg product.

12. The meat product of claim 10, wherein the raw comminuted meat composition is comminuted by grinding.

13. The meat product of claim 10 further comprising, liquid smoke added to the tacky meat composition.

14. The meat product of claim 10, wherein the raw comminuted meat composition includes at least one of ham, bacon, sausage, turkey, and Canadian bacon.

15. The meat product of claim 10, wherein the carotenoid stabilizing composition is added in an amount ranging from about 0.05% to about 0.25% by weight of the raw comminuted meat composition.

16. The meat product of claim 10, wherein the carotenoid stabilizing composition includes a fat composition.

17. The meat composition of claim 16, wherein the fat composition includes an oleoresin composition.

18. The meat product of claim 17, wherein the oleoresin composition is extracted from paprika.

19. A method for utilizing an oleoresin of paprika to create a meat product for storage in a food composition comprising:
    adding a salt mix to a raw comminuted meat composition to form a tacky meat composition;
    mixing the oleoresin of paprika with the tacky meat composition to form a meat precursor;
    processing the meat precursor thermally to form a processed meat precursor; and
    adding the processed meat precursor to a food product,
    wherein the oleoresin of paprika interacts with at least one of fat, protein, and myoglobin of the tacky meat composition to form a complex that, after thermal processing and upon protein denaturation, allows at least one of the interior and exterior color, the flavor, and the texture of the meat product to be retained for at least the shelf-life of the food product.

20. The method of claim 19, wherein the food product includes at least one of a soup and a liquid egg product.

21. The method of claim 19, wherein the raw comminuted meat composition is comminuted by grinding.

22. The method of claim 19, further comprising, adding liquid smoke to the tacky meat composition.

23. The method of claim 19, wherein the raw comminuted meat composition includes at Least one of ham, bacon, sausage, turkey, and Canadian bacon.

24. The method of claim 19, wherein the oleoresin of paprika is added in an amount ranging from about 0.05% to about 0.25% by weight of the raw comminuted meat composition.

* * * * *